Dec. 8, 1959  H. W. LAMB  2,916,017
FEED CONTROL FOR MACHINE TOOLS
Filed Oct. 17, 1957  2 Sheets-Sheet 1

Harold W. Lamb
INVENTOR.

BY [signature]
ATTORNEY

Dec. 8, 1959  H. W. LAMB  2,916,017
FEED CONTROL FOR MACHINE TOOLS
Filed Oct. 17, 1957  2 Sheets-Sheet 2

Harold W. Lamb
INVENTOR.

BY *J. N. Mills*
ATTORNEY

2,916,017
FEED CONTROL FOR MACHINE TOOLS

Harold W. Lamb, Trenton, N.J., assignor to Crossley Machine Company, Inc., a corporation of New Jersey Application October 17, 1957, Serial No. 690,864

4 Claims. (Cl. 121—45)

This invention relates to improvements in automatic feed controls for grinders and other machine tools of the type in which a reciprocatory work or tool-carrying support is movable on a horizontal bed or table by pressure of oil or other liquid in a cylinder containing a piston coupled to the movable support, and, also, in which a uniform step by step advance of the piston is effected through a second cylinder of a lesser diameter than and in fluid communication with the rear end of the first mentioned cylinder and containing a floating cylinder the stroke or travel of which is adjustably limited, so that the amount of oil forced into the larger cylinder and, consequently, the extent of the steps of feed can be varied to suit the character of the work performed by the machine.

In previous automatic feed controls of the type mentioned, of which I am aware, the pressure medium consisting of oil or other liquid under pressure is controlled by numerous valves and other movable elements of complicated and expensive character built into the machine. Therefore, one of the principal objects of the present invention is to provide a fluid operated automatic feed control of more direct acting and simplified construction than previous designs, and which will also be highly efficient as well as fool-proof in operation.

In keeping with the foregoing object it is a further object of the present invention to provide a fluid operated automatic feed control unit of the character referred to in which all the operating parts are contained within a single housing which can easily be attached in operating relation to any machine tool for which it is adapted.

Another important object of this invention is to provide a fluid operated feed control for machine tools having means for stopping the advance of the work or tool support in the event that the cutting tool stops in its advance, for example, when the cutting tool fails in its cutting operation. This safety features is aided by the application of a constant fluid back pressure against the front of the piston coupled to the work support, which back pressure is essentially lower than the fluid pressure applied against the front of the piston for effecting its advance movements. The back pressure is also utilized for retracting the piston and work support.

In accomplishing the foregoing and other objects and advantages of my invention, I preferably employ a combination of liquid and air pressure by forming wells in the housing which are in direct communication with the two cylinders previously referred to, partially filling the wells with oil or other suitable liquid and applying differing air pressures to the spaces above the liquid in the respective wells and exhausting the air pressure to the atmosphere in repeated cycles in each of which the liquid displaced by the small piston forces the larger piston together with the movable support forward a step in its advance. The cycles of step by step advance by the large cylinder may be so regulated as to cease after a predetermined number of steps and automatically returned to its starting position. The operating elements of this control unit consist only of the two pistons referred to and the valves for the admission to and the exhaust from the wells of the air pressure through which the liquid is sequentially placed under the differential air pressures through which cycles of automatic movement of the movable support are effected. The valves may be electrically or otherwise suitably operated.

The use of combination liquid and air pressure with wells to contain the liquid has certain operating advantages including long continued operation without need of replenishing the liquid, and the fact that pressure is instantly applied to and released from the liquid by means of air pressure, thereby obtaining greater steadiness of movement of the work support than would be possible with only air pressure, and yet having the benefits of liquid pressure without the necessity of providing a pipe system for containing liquid exhausted from the fluid pressure conduits. However, it is within the scope of my invention to employ a combination of liquid and air, as mentioned or liquid as the sole medium of operating the piston attached to the work or tool support; either with or without the wells referred to. It is also within the scope of my invention to use air pressure as the sole medium of operating the piston attached to the support.

Further objects and advantages of my improved automatic feed control will be apparent or pointed out in the following specification in which reference is had to the accompanying drawings in which Fig. 1 is a plan view partly in section of the feed control unit showing the piston of the main cylinder coupled to the work support of a conventional grinder;

Figure 1:
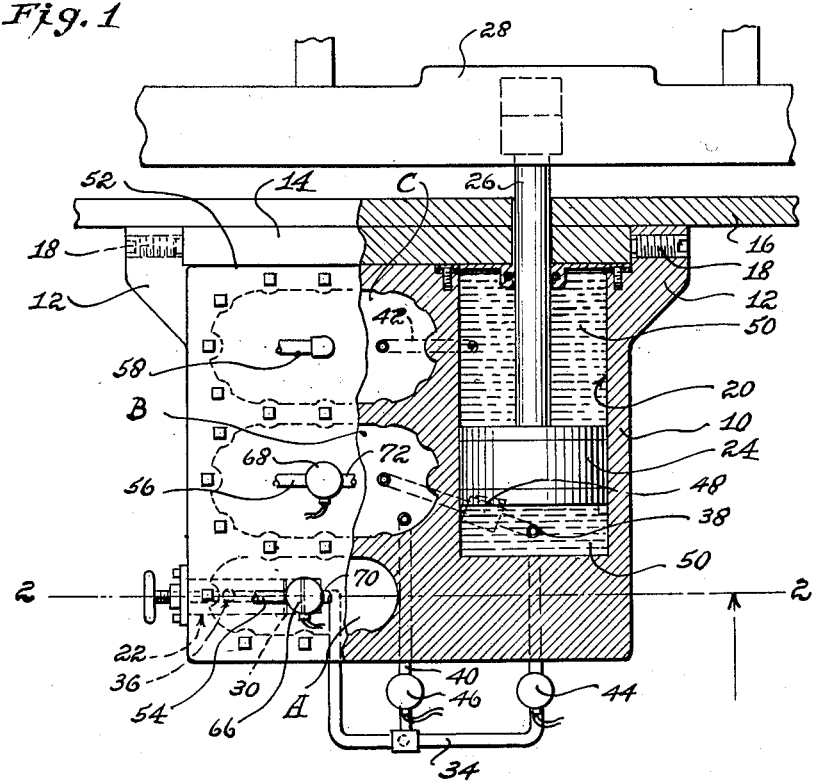

Referring to the drawings in which like reference characters designate like parts or elements in the several views, it is pointed out that the illustrations are restricted to the essential features of an automatic feed control in accordance with my invention. The control valves shown only in schematic form may be of conventional electrical type actuated by means of switches (not shown) mounted on the grinder in any suitable manner. The source of air pressure (not shown) may be provided by any suitable air pump or compressor.

Figure 2:
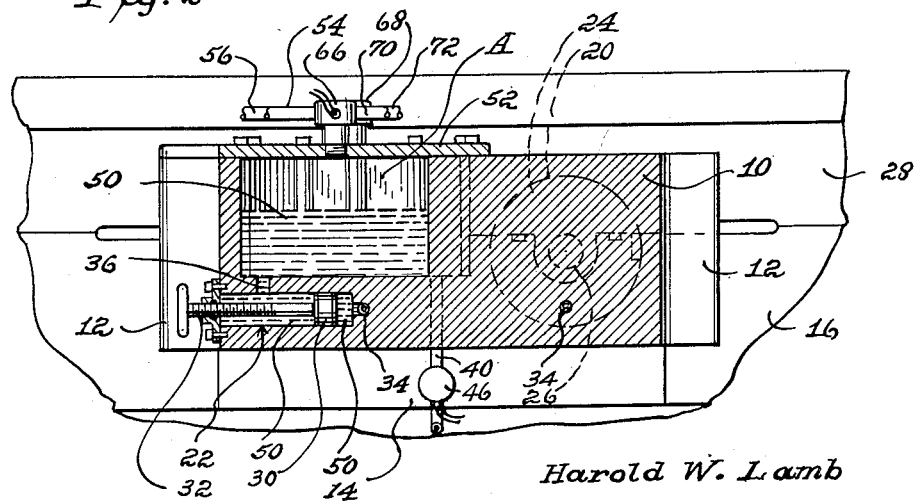
Fig. 2 is a section taken on the line 2—2 of Fig. 1, but with the visible valve shown in elevation.

As shown in detail in Figs. 1 and 2, the automatic feed control unit includes a flat, rectilinear housing 10 having at its front edges a pair of projecting portions 12 which are laterally spaced to fit over a plate 14 on the side of the frame 16 of the grinder, to which it may be rigidly attached by means of set screws 18 or by other suitable means. A cylinder 20 is bored from the front of the housing to a plane near its rear end, and a second cylinder 22 of a substantially lesser diameter is bored into the housing perpendicular to and beyond the rear end of the cylinder 20. A piston 24 is mounted for reciprocatory movement in the cylinder 20 and has a forwardly projecting piston rod 26 coupled to the movable work support 28 of the grinder. A floating piston 30 is mounted for free movement in the smaller cylinder 22, the stroke or travel of this piston being limited by abutment with the inner end of an adjustable screw 32 mounted in the side of the housing 10. The cylinder 22 is in liquid communication with the rear end of the cylinder 20 through a pipe 34. Formed in the housing 10 are three wells, designated A, B, and C. Well A is in liquid communication with the small cylinder 22 through a duct 36 at a point back of the piston 30. Well B is in liquid communication with the cylinder 20 back of the piston 24 through a pipe 38 and is also in intersecting liquid communication with pipe 34, between the cylinders 20 and 22 through a pipe 40. Well C is in liquid communication with cylinder 20 in front of its piston through a duct 42. Flow of liquid through pipe 34 is controlled by a valve 44, located between the intersection of the two pipes and the cylinder 20 and flow through pipe 40 is controlled by a valve 46. These valves are cooperative and automatically operated by electrical means (not shown), as will hereinafter be explained. Flow through pipe 38 is controlled by a manually operated electrical valve 48.

Figure 3:
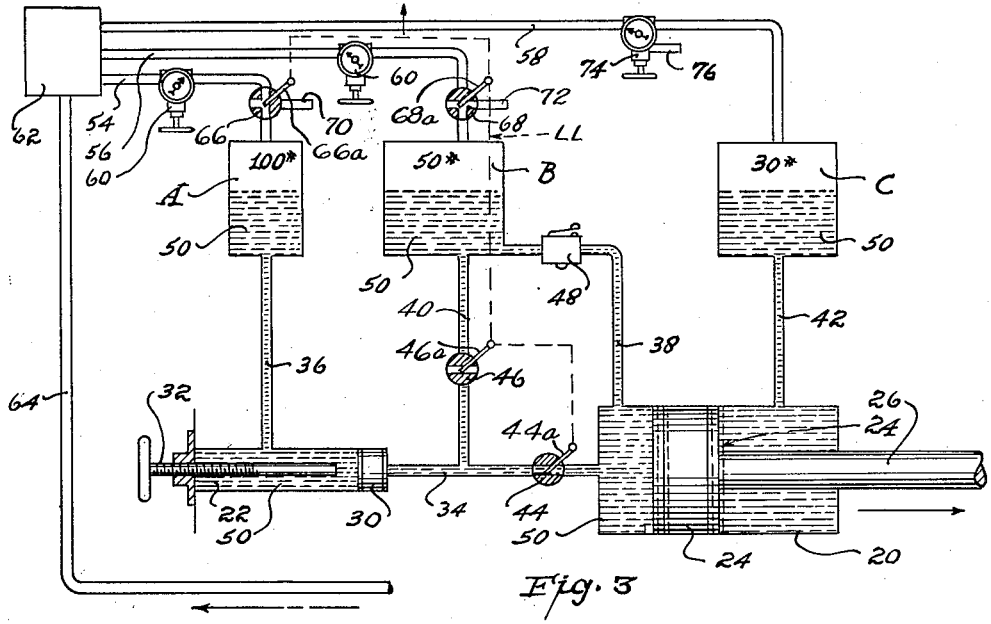
Fig. 3 is a schematic view of the entire feed control with the two pistons in their starting positions.
Figure 4:
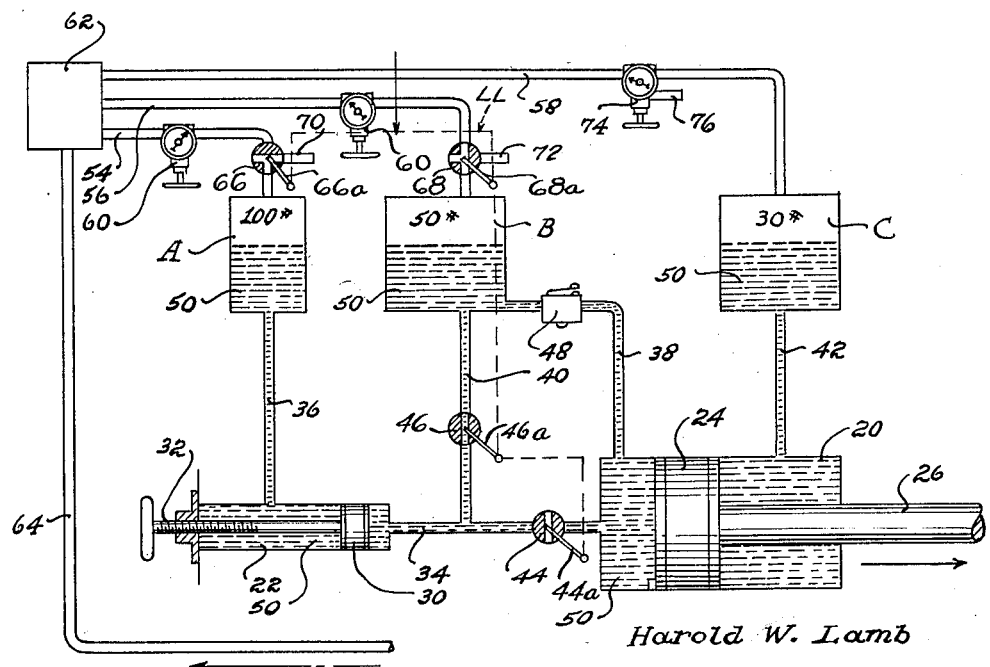
Fig. 4 is a view similar to Fig. 3 but showing the two pistons after completing the first step in advance movement.

As shown in Figs. 3 and 4, the wells A, B, and C, are partially filled with oil or other suitable liquid 50, and, through the above mentioned ducts and pipes, the entire spaces in the cylinders 20 and 22 are also filled with the same liquid. The open ends of the wells are closed by a plate 52 to provide air pressure spaces above the level of the liquid in the wells. As also shown in Figs. 3 and 4, air pressure supply pipes 54, 56 and 58 are in communication with the air pressure spaces in the respective wells A, B, and C. The respective pipes 54 and 56 are provided with pressure reducing valves 60, by means of which the pressures in wells A and B may be set in differential relation to each other and to well C, even though the two pipes may extend from a pressure tank 62 containing a single pressure supply through a pipe 64 connected to an air pump or compressor (not shown). Pipes 54 and 56 are also provided with automatic electrical valves 66 and 68 located between the respective reducing valves 60 and their associated wells A and B. These valves are of a three-way type adapted to open their respectively associated air pressure supply pipes 54 or 56 while at the same time closing their connected exhaust pipes 70 or 72, or vice versa. Air pressure supply pipe 58, also connected to tank 62, is provided with a combination pressure reducing and relief valve 74, having a discharge pipe 76 through which excessive pressure in well C is exhausted to the atmosphere. As will be further explained, well C has three main functions one of which is to maintain a constant back pressure against the larger piston 24, this pressure being sufficiently lower than that in either of the other two wells to be overcome when pressure from either of the first two wells is exerted against the back of the piston, but sufficiently high to hold the piston steady in its advance movements. Another function of the pressure in well C is to retract the larger piston when the pressure from the other two wells has been removed from the back of the piston. A third function of the constant back pressure from well C is that when the work or tool in the movable support stops advancing because of failure of the cutting tool this back pressure combines with the contact of the tool against the work to quickly accumulate a back pressure against the piston in the smaller cylinder, thereby stopping its advance movement, which also stops the advance of the larger piston and the work or tool support and preventing damage to the work or the machine tool.

The operation of my improved automatic feed control will now be described, and in connection therewith it should be understood that valves 66 and 68 are preferably electrically operated three-way valves, and valves 44 and 46 are electrically operated two-way valves actuated in the sequences described through a properly connected electrical circuit and switches suitably disposed therein, all being of conventional design, and not shown in the drawing. Since the necessary reciprocatory movements of the pistons 24 and 30 are effected entirely through the periodic application of differential air pressures on the oil or other liquid in the wells A, B, and C, as will hereinafter be explained, it is essential that the air pressure supplied through supply pipe 64 be at least as high as the highest pressure applied to one of the wells.

As illustrated in the schematic views Figs. 3 and 4, it is assumed that the highest pressure, say 100 pounds per square inch, is applied to well A, a lower pressure, say 50 pounds per square inch, applied to well B, and a still lower pressure, say 30 pounds per square inch, applied to well C. Obviously, the pressure in supply pipe 64 may be well above 100 pounds per square inch and reduced through the reducing valves 60 and the pressure reducing and relief valve 74 to the desired differential pressures to be applied to the liquid in the wells. As will be seen, it is essential that the air pressure in well C be less than that in well B or A, but the control will operate satisfactorily with a uniform pressure in wells B and A.

For purposes of illustration, the control valves 44, 46, 66 and 68 are indicated as being of the rotary type provided with operating arms 44a, 46a, 66a and 68a. Broken linking lines LL connected to the arms show the unison of movement of these valves to and from their open and closed positions; from which it will be seen, for example, in Fig. 3, that valve 44 in the conduit 34, between the two cylinders 22 and 50, will be open when valve 66, in conduit 54, is open and at the same time valve 68, in conduit 56, and valve 46, in conduit 40, will be closed. It will also be seen in Fig. 4 that valve 44 will be closed, and valves 46 and 68 will be open when valve 66 is closed.

In Fig. 3 the pistons 24 and 30 are shown in their starting positions, before the beginning of a step in the advance of the piston 24 in the direction of the arrow. At this stage three-way valve 68 has exhausted the air pressure from well B to the atmosphere; valve 44 is open, valve 46 is closed, and the air pressure in well C has forced piston 24 to its rearmost position. Since well A is still in open communication with air pressure supply pipe 54, the pressure in well A is tightly holding the small floating piston 30 against the rear end of the cylinder 22. In the next stage, as shown in Fig. 4, two-way valve 44 is closed, valve 46 is opened, well B is pressurized through three-way valve 68, and the air exhausted from well A through three-way valve 66. This permits the liquid under pressure from well B to force small floating piston 30 back into abutment with the end of the stroke adjusting screw 32, the space in cylinder 22 in front of the piston being then filled with liquid under pressure from well B. At this stage, two-way valve 46 will close (as in Fig. 3), valve 44 will open (as in Fig 3), and well A will again be pressurized through three-way valve 66 (as in Fig. 3), at which time the small piston 30 will instantly be impelled forwardly by the liquid under pressure from well A (as in Fig. 3), thereby forcing the liquid in front of the small piston into the rear end of cylinder 20 (as again shown in Fig. 3) and thus forcing the large piston 24 forwardly a step corresponding to the quantity of oil displaced in front of the large piston 24 by the quantity forced into the large cylinder from the small cylinder by the piston 22. The quantity of oil or other liquid displaced in front of the large piston 24 will be forced into duct 42 toward well C, the pressure in that well being less than that in well A, which impels the two pistons, and, therefore, being overcome by the higher pressure. At this point, in sequence, valve 44 will close (as in Fig. 4), valve 46 will open (as in Fig. 4) and well A will be exhausted to the atmosphere (as in Fig. 4) and the pressure in well B will force small piston 30 back into abutment with the end of the stroke adjusting screw 32. That ends the first cycle of step by step advance of the large piston 24 and the movable work support 28 coupled to the piston rod 26 (Fig. 1).

As previously mentioned the pressure in well C maintains a constant back pressure against the large piston 24, which renders the piston steady in its steps of advance movements through the liquid forced into the rear end of the cylinder 20 by the small piston 30 under the higher pressure in well A. However, if the work support 28 stops in its advance movement, as, for example, when the cutting or grinding tool suddenly fails in its cutting actions, the pressure of the tool against the work combined with the pressure from well C will quickly overcome the force exerted through the smaller piston 30 and stop its advance movement. Thus the feed will be automatically stopped before any damage is done to the work or tool.

At the start of the second cycle of operation valve 46 will close (as in Fig. 3), well A will be pressurized (as in Fig. 3) and valve 44 will open (as in Fig. 3). The operation of the feed control from then on in repeated cycles will be the same as already described, that is, the next stage being that the small piston 30 will be forced forwardly by the pressure from well A. At the end of the cycle the pressure from well B will impel small piston 30 back into abutment with the end of the stroke adjusting screw 32, as in the preceding cycle.

Well C is under constant air pressure during the operation of the automatic feed control, but, being under a pressure lower than that of either of the wells A or B its resistance to advance movement of piston 24 will be overcome by the pressure in either of the wells A or B. At the end of the desired number of step by step advance movements of piston 24 the various control valves will revert to the positions shown in Fig. 3, and the piston will be retracted to its starting position by fluid pressure from well C, as previously described. However, the retracting, or rearward movement of piston 24 under pressure from well C may be stopped at any time by closing valve 44.

As a convenience in setting up the movable support 23 for a grinder or other machine tool, with well B being pressurized through valve 68, valve 48 may be opened at any time, provided that valve 44 is closed, to effect any desired forward movement of the piston 24, within the limits of its stroke, independently of the action of the small piston 30.

The embodiment of my feed control illustrated and described, designed for the use of a combination of static liquid under controlled air pressure has certain advantages over such a system using liquid or air singly. It does not require provision for containment of fluid exhausted from the system during its cycles of operation but does have the stability of piston movements afforded by conventional hydraulic feed control systems, in a more simplified construction, as compared with the lesser stability of completely air operated feed controls. However it is within the scope of my invention to use either liquid or air, solely in operation of the control elements.

Obviously various changes or modifications in my improved feed control may be made without departing from the spirit and scope of my invention. It should, therefore, be understood that the construction and arrangements shown and described are intended to be illustrative only, and restricted only by the appended claims.

I claim:

1. In a machine tool having a reciprocatory work support and a cylinder with a fluid pressure actuated piston coupled to said support and also a second cylinder of a lesser diameter than said first cylinder and having therein a fluid pressure actuated floating piston and means for limiting its axial movements, said second cylinder also having a fluid outlet conduit in front of its piston communicating with the rear end of said first cylinder, fluid pressure means for effecting through said second cylinder and piston step by step advance movements of said first piston and work support, said means comprising, in combination, three fluid pressure inlet conduits communicating with a source of fluid pressure, the first conduit communicating with said second cylinder back of its piston, the second conduit having intersecting communication with the conduit between the two cylinders and also having a branch conduit communicating with the first cylinder back of its piston, and the third conduit communicating with the first cylinder in front of its piston for maintaining a constant back pressure against said piston, and also providing means for retracting said piston, the fluid pressure in the third conduit being lower than that in either of the first two conduits, said third conduit being provided with a pressure relief valve, cooperative combination fluid pressure inlet and exhaust valves in the first two fluid pressure supply conduits whereby the fluid pressure will be exhausted from either of said conduits while fluid pressure is being admitted into the other, a control valve in the second fluid pressure inlet conduit between its combination valve and its intersection with the conduit between the two cylinders, and another control valve in the conduit between the two cylinders located between the intersection of the said two conduits and the first cylinder, said valves being cooperative with each other and with the two said combination fluid pressure inlet and exhaust valves whereby the control valve between said two cylinders will be open when fluid pressure is admitted through the combination fluid pressure supply and exhaust valve into the first fluid pressure supply conduit and the two valves in the second fluid pressure supply conduit will be closed and whereby the control valve between said two cylinders will be closed and the two valves in the second fluid pressure supply conduit will be open when the combination fluid pressure supply and exhaust valve into the first fluid pressure supply conduit is closed.

2. In a machine tool having a reciprocatory work support and a cylinder with a liquid pressure actuated piston coupled to said support and also a second cylinder of a lesser diameter than said first cylinder and having therein a liquid pressure actuated floating piston and means for limiting its axial movements, said second cylinder also having a liquid outlet conduit in front of its piston communicating with the rear end of said first cylinder, fluid pressure means for effecting through said second cylinder and piston step by step advance movements of said first piston and work support, said means comprising, in combination, three air pressure inlet conduits communicating with a source of air pressure, the first conduit communicating with said second cylinder back of its piston, the second conduit having intersecting communication with the conduit between the two cylinders and also having a branch conduit communicating with the first cylinder back of its piston, and the third conduit communicating with the first cylinder in front of its piston for maintaining a constant back pressure against said piston, and also providing means for retracting said piston, each of said conduits being partially filled with a liquid, and also the spaces in said cylinders also being filled with the liquid, the liquid pressure in the third conduit being lower than that in either of the other two conduits, said third conduit being provided with a pressure relief valve, cooperative combination air pressure inlet and exhaust valves in the first two air pressure inlet conduits whereby the air pressure will be exhausted from either of said conduits while air pressure is being admitted into the other, a control valve in the second air pressure inlet conduit between its combination valve and its intersection with the conduit between the two cylinders, and another control valve in the conduit between the two cylinders located between the intersection of the said two conduits and the first cylinder, said valves being cooperative with each other and with the two combination air pressure inlet and exhaust valves whereby the control valve between said two cylinders will be open when air pressure is admitted through the combination air pressure supply and exhaust valve into the first air pressure supply conduit and the two valves in the second air pressure supply conduit will be closed, and whereby the control valve between said two cylinders will be closed and the two valves in the second air and liquid supply conduit will be open when the combination air pressure supply and exhaust valve into the first air pressure supply conduit is closed.

3. In a machine tool having a reciprocatory work support and a cylinder with a liquid pressure actuated piston coupled to said support and also a second cylinder of a lesser diameter than said first cylinder and having therein a liquid actuated floating piston and means for limiting its axial movements, said second cylinder also having a liquid outlet conduit in front of its piston communicating with the rear end of said first cylinder, fluid pressure means for effecting through said second cylinder and piston step by step advance movements of said first piston and work support, said means comprising, in combination, three closed wells each being partially filled with a liquid and all having air pressure supply conduits communicating with a source of air pressure and with the space above the liquid, and all the spaces in said cylinders also being filled with the liquid, the first well having a liquid outlet conduit communicating with the second cylinder back of its piston, the second well having a liquid outlet conduit having intersecting communication with the conduit between the two cylinders, and another liquid outlet conduit communicating with the first cylinder back of its piston, and the third well having a liquid outlet conduit communicating with the first cylinder in front of its piston for maintaining a constant back pressure against said piston, and also providing means for retracting said piston, the air pressure on the third well being lower than that in either of the first two wells, said third well being provided with a pressure relief valve, cooperative combination air inlet and exhaust valves in the air pressure supply conduits of the first two wells whereby the air pressure will be exhausted from either of said wells while air pressure is being admitted into the other, a control valve in the conduit between the second well and its intersection with the conduit between the two cylinders and another control valve in the conduit between the two cylinders located between the intersection of the said two conduits and the first cylinder, said valves being cooperative with each other and with the two said combination air pressure inlet and exhaust valves whereby the control valve between the two cylinders will be open when air pressure is admitted through the combination air pressure and exhaust valve into the first well and the two valves communicating with the second well will be closed, and whereby the control valve between the two cylinders will be closed when air pressure is admitted through the combination air pressure and exhaust valve into the first well and the two valves communicating with the second well will be open.

4. A machine tool as claimed in claim 3 in which the cylinder and wells are all formed in a uniform housing, the latter being provided with means for being fixedly attached to said machine tool.

References Cited in the file of this patent

UNITED STATES PATENTS

| | | |
|---|---|---|
| 2,703,040 | Horlacher | Mar. 1, 1955 |
| 2,733,691 | Johnson | Feb. 7, 1956 |
| 2,751,822 | Schiltz | June 26, 1956 |